(12) United States Patent
Higgins et al.

(10) Patent No.: US 11,640,563 B2
(45) Date of Patent: May 2, 2023

(54) AUTOMATED DATA PROCESSING AND MACHINE LEARNING MODEL GENERATION

(71) Applicant: Accenture Global Solutions Limited, Dublin (IE)

(72) Inventors: Luke Higgins, West Pymble (AU); Liang Han, Wantirna (AU); Koushik M Vijayaraghavan, Chennai (IN); Rajendra T. Prasad, Basking Ridge, NJ (US); Aditi Kulkarni, Bengaluru (IN); Gayathri Pallail, Bangalore (IN); Charles Grenet, Antony (FR); Jean-Francois Depoitre, Magnée (BE); Xiwen Sun, McKinnon (AU); Jérémy Aeck, Chambourcy (FR); Yuqing Xi, Paris (FR); Srikanth Prasad, Bangalore (IN); Pankaj Jetley, Basking Ridge, NJ (US); Jayashri Sridevi, Chennai (IN); Easwer Chinnadurai, Lutz, FL (US); Niju Prabha, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 405 days.

(21) Appl. No.: 16/827,292

(22) Filed: Mar. 23, 2020

(65) Prior Publication Data

US 2021/0065053 A1    Mar. 4, 2021

(30) Foreign Application Priority Data

Aug. 30, 2019    (EP) ..................................... 19290076

(51) Int. Cl.
*G06N 20/20*    (2019.01)
*G06N 20/00*    (2019.01)
(Continued)

(52) U.S. Cl.
CPC ............. *G06N 20/20* (2019.01); *G06F 9/542* (2013.01); *G06F 18/211* (2023.01);
(Continued)

(58) Field of Classification Search
None
See application file for complete search history.

(56) References Cited

U.S. PATENT DOCUMENTS 10,997,258 B2 *  5/2021  Chen .................... G06F 16/3329
11,227,047 B1 *  1/2022  Vashisht ................. G06F 21/56
(Continued)

FOREIGN PATENT DOCUMENTS

CN    110389978 A  * 10/2019  ........... G06F 16/254
CN    110489578 A  * 11/2019
(Continued)

OTHER PUBLICATIONS

Extended European Search Report for Application No. EP19290076.9, dated Mar. 4, 2020, 8 pages.

*Primary Examiner* — Mohammed Rachedine
(74) *Attorney, Agent, or Firm* — Harrity & Harrity, LLP

(57) ABSTRACT

A device may obtain first data relating to a machine learning model. The device may pre-process the first data to alter the first data to generate second data. The device may process the second data to select a set of features from the second data. The device may analyze the set of features to evaluate a plurality of types of machine learning models with respect to the set of features. The device may select a particular type of machine learning model for the set of features based on analyzing the set of features to evaluate the plurality of types of machine learning models. The device may tune a set of parameters of the particular type of machine learning model to train the machine learning model. The device may receive
(Continued)

third data for prediction. The device may provide a prediction using the particular type of machine learning model.

20 Claims, 8 Drawing Sheets

(51) Int. Cl.
*G06F 9/54* (2006.01)
*G06F 18/23* (2023.01)
*G06F 18/211* (2023.01)
*G06F 18/214* (2023.01)
*G06F 18/21* (2023.01)
*G06F 18/241* (2023.01)
*G06F 18/20* (2023.01)

(52) U.S. Cl.
CPC .......... *G06F 18/214* (2023.01); *G06F 18/217* (2023.01); *G06F 18/23* (2023.01); *G06F 18/241* (2023.01); *G06F 18/285* (2023.01); *G06N 20/00* (2019.01)

(56) References Cited

U.S. PATENT DOCUMENTS

| | | | |
|---|---|---|---|
| 2012/0191631 A1* | 7/2012 | Breckenridge | G06N 20/00 706/12 |
| 2019/0138946 A1 | 5/2019 | Asher et al. | |
| 2020/0363501 A1* | 11/2020 | Lau | G01S 7/4017 |
| 2021/0019374 A1* | 1/2021 | Donaldson | G06F 40/30 |
| 2021/0042573 A1* | 2/2021 | Krishnamoorthy | G06V 10/771 |
| 2021/0049363 A1* | 2/2021 | Freitas Cunha | H04W 4/021 |
| 2021/0112178 A1* | 4/2021 | Perone | G06F 40/35 |

FOREIGN PATENT DOCUMENTS

| | | | | |
|---|---|---|---|---|
| CN | 110581840 B | * | 10/2020 | |
| CN | 110263938 B | * | 7/2021 | ........... G06F 9/3867 |
| CN | 110532306 B | * | 12/2021 | ........... G06F 16/254 |
| CN | 106937774 B | * | 5/2022 | ............... A43D 1/04 |
| EP | 3483797 A1 | | 5/2019 | |
| WO | WO-2017112813 A1 | * | 6/2017 | ....... G06F 16/90332 |

* cited by examiner

AUTOMATED DATA PROCESSING AND MACHINE LEARNING MODEL GENERATION

RELATED APPLICATION(S)

This application claims priority to European Patent Application No. 19290076.9, filed on Aug. 30, 2019, and entitled "AUTOMATED DATA PROCESSING AND MACHINE LEARNING MODEL GENERATION," the content of which is incorporated by reference herein in its entirety.

BACKGROUND

Different types of machine learning algorithms may be deployed to complete different tasks. Examples of machine learning algorithms include regression algorithms, instance-based algorithms, regularization algorithms, decision tree algorithms, Bayesian algorithms, clustering algorithms, association rule algorithms, artificial rule learning algorithms, artificial neural network algorithms, deep learning algorithms, dimensionality reduction algorithms, ensemble algorithms, and/or the like. Some machine learning algorithms may receive, as input, data in a particular format and may be trained to provide predictions as output. For example, a natural language processing algorithm may be trained to determine a semantic meaning of a sentence. In this case, a device executing the natural language processing algorithm may receive a sentence as input, may determine the semantic meaning of the sentence, and may provide information identifying the semantic meaning as output.

SUMMARY

According to some implementations, a method may include obtaining first data relating to a machine learning model, pre-processing the first data to alter the first data to generate second data, processing the second data to select a set of features from the second data, analyzing the set of features to evaluate a plurality of types of machine learning models with respect to the set of features, selecting a particular type of machine learning model, of the plurality of types of machine learning models, for the set of features based on analyzing the set of features to evaluate the plurality of types of machine learning models, tuning a set of parameters of the particular type of machine learning model to train the machine learning model, providing access to the particular type of machine learning model via an interface, receiving, as input via the interface, third data for prediction using the particular type of machine learning model, and providing, as output via the interface, a prediction using the particular type of machine learning model based on receiving the third data.

According to some implementations, a device may include one or more memories; and one or more processors, communicatively coupled to the one or more memories, configured to receive input data from a data source, pre-process and filter the input data to generate intermediate data based on receiving the input data, label one or more missing labels in the intermediate data to generate output data based on generating the intermediate data, select, for the output data, a machine learning model, of a plurality of types of machine learning models, to apply to the output data, tune a set of hyper-parameters for the machine learning model based on selecting the machine learning model, establish a model pipeline for the machine learning model based on tuning the set of hyper-parameters, receive prediction data based on establishing the model pipeline, perform a prediction using the machine learning model and using the prediction data, and provide the prediction for display via a user interface based on performing the prediction.

According to some implementations, a non-transitory computer-readable medium may store one or more instructions. The one or more instructions, when executed by one or more processors of a device, may cause the one or more processors to obtain first data relating to a natural language processing or image processing task, pre-process and filter the first data to generate second data, process the second data to select a set of features from a plurality of features of the second data, apply the set of features to a plurality of types of machine learning models to evaluate the plurality of types of machine learning models with respect to completing the natural language processing or image processing task, select a particular type of machine learning model, from the plurality of types of machine learning models, for the set of features based on applying the set of features to the plurality of types of machine learning models, provide access to the particular type of machine learning model via an interface, receive, as input via the interface, third data for prediction using the particular type of machine learning model, and provide, as output via the interface, a prediction, using the particular type of machine learning model, based on receiving the third data, the prediction being a text-completion prediction or an image recognition prediction.

DETAILED DESCRIPTION

Figure 1A:
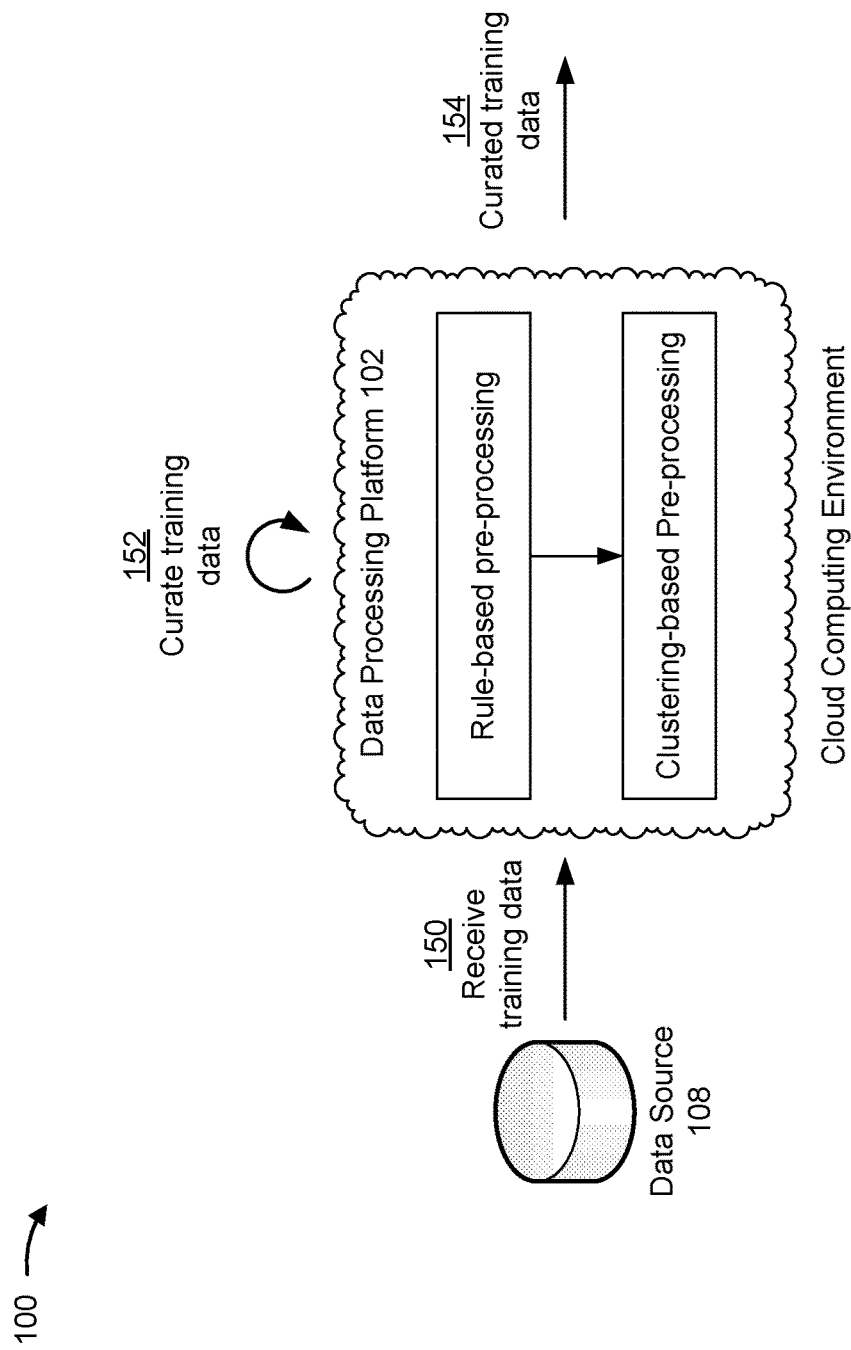
FIGS. 1A-1C are diagrams of an example implementation described herein.

The following detailed description of example implementations refers to the accompanying drawings. The same reference numbers in different drawings may identify the same or similar elements.

A platform may train a machine learning algorithm to perform a prediction using large amounts of data, such as thousands, millions, or even billions of data points. The platform may obtain the data from monitoring sensors, monitoring systems, processing documents (e.g., using optical character recognition), receiving results of a data entry task, and/or the like. However, the data may have deficiencies. For example, a platform may obtain data that includes missing fields as a result of an error in data collection, a limit in the data collection, a data reduction to reduce memory requirements, and/or the like. Similarly, a platform may obtain data that is inaccurate as a result of mislabeling, obscuring, and/or the like. Furthermore, the platform may obtain biased data as a result of data collection techniques that result in more data collection of a first type of data than of a second type of data. An additional issue that exists is that platforms may have many different machine learning algorithms available to process data. For example, a platform may have access to code for one or more regression algorithms, one or more artificial neural network algorithms, and/or the like. Trial-and-error based selection from tens, hundreds, or even thousands of available algorithms may result in an excessive utilization of computing resources.

Some implementations described herein enable automated data processing and machine learning model generation, deployment, and operation. For example, a platform may perform a data curation procedure to improve data quality of data being provided for training of machine learning models. Additionally, or alternatively, the platform may automatically recommend a particular type of machine learning model for a particular data analysis task based on data relating to the data analysis task. In this case, based on recommending the particular type of machine learning model, the platform may automatically train and deploy the particular type of machine learning model to enable data analysis.

In this way, the platform reduces a likelihood of errors in machine learning predictions relative to machine learning algorithms that intake deficient data and attempt to compensate for the deficient data within the machine learning algorithms. Moreover, the platform reduces a likelihood of errors in machine learning predictions by enabling selection of a type of machine learning algorithm well-suited for a particular data analysis task. Furthermore, by improving and increasing an efficiency of data curation, machine learning model selection, machine learning model training, and machine learning model deployment, the platform may reduce an amount of time to provide a data analysis capability, thereby reducing a production cycle for new software functionalities.

Figure 1B:
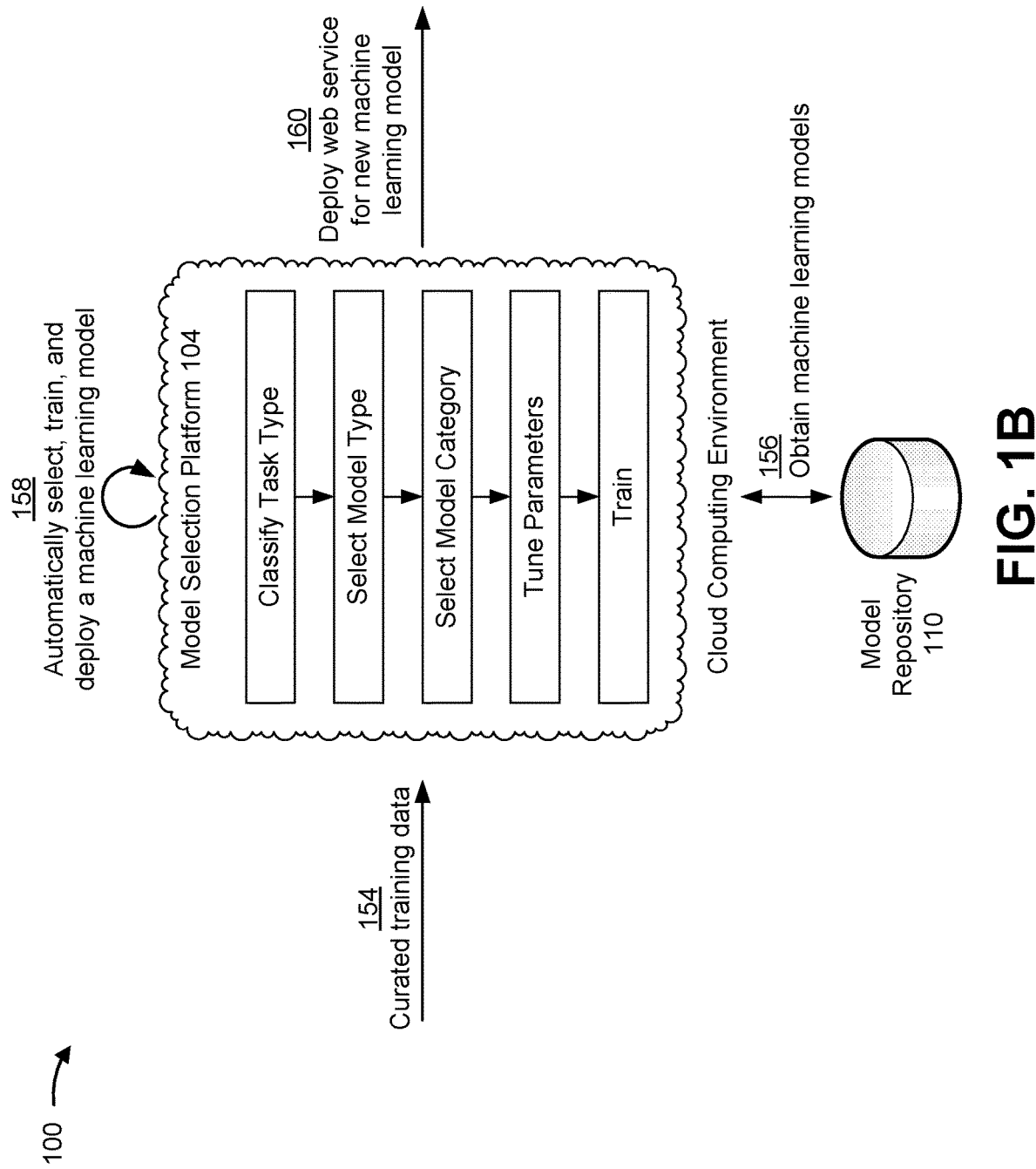
Figure 1C:
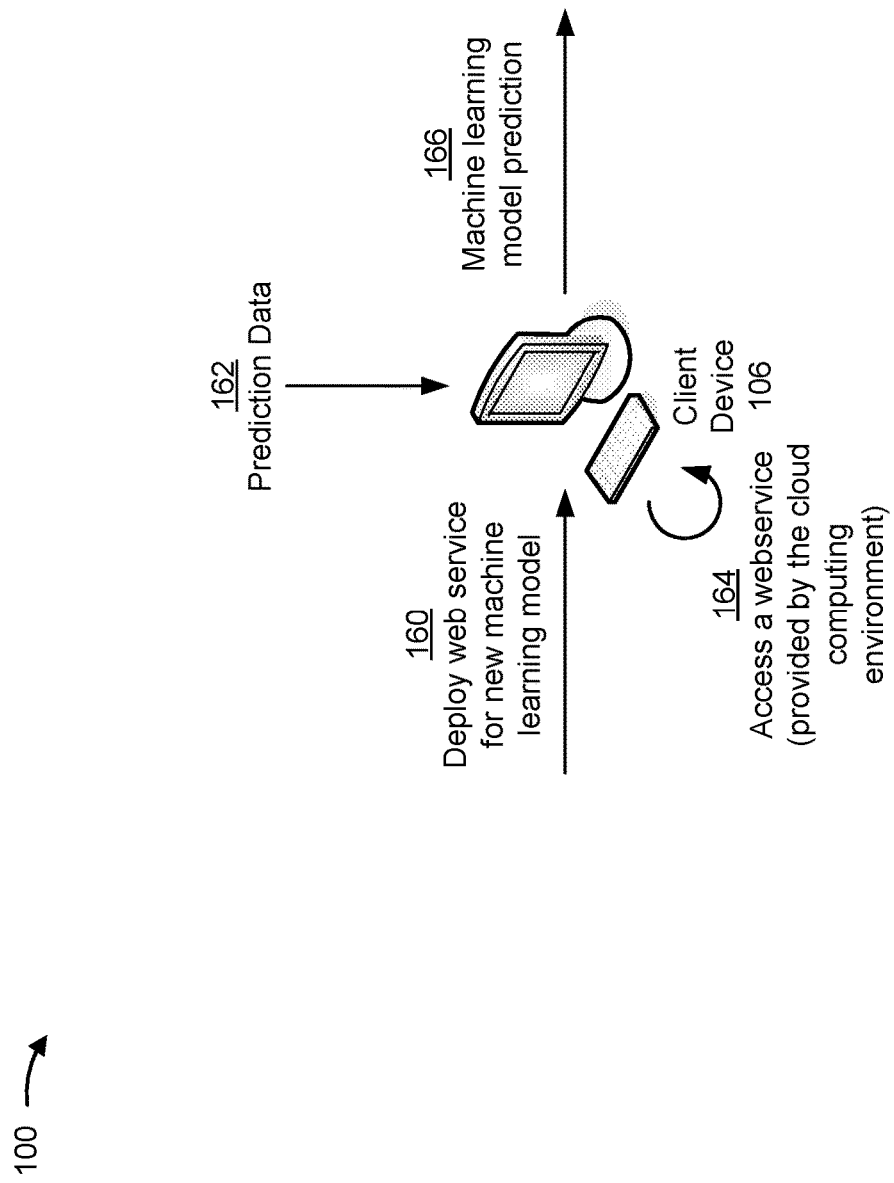

FIGS. 1A-1C are diagrams of an example implementation 100 described herein. As shown in FIGS. 1A-1C, example implementation 100 includes a data processing platform 102 (e.g., hosted in a cloud computing environment), a model selection platform 104 (e.g., hosted in a cloud computing environment), a client device 106, a data source 108, and a model repository 110.

As further shown in FIG. 1A, and by reference number 150, data processing platform 102 may receive training data. Data processing platform 102 may receive the training data from data source 108. For example, data processing platform 102 may receive a natural language processing data set, an image processing and/or computer vision data set, and/or the like. In some implementations, data processing platform 102 may provide a user interface identifying characteristics of the training data. For example, data processing platform 102 may provide a scatter plot and a summary table of the training data to enable verification that a data set is uploaded correctly. In some implementations, data processing platform 102 may obtain contextual information relating to the training data, such as information identifying input fields, output fields, a clustering parameter for clustering-based pre-processing, and/or the like.

As further shown in FIG. 1A, and by reference number 152, data processing platform 102 may curate the training data. For example, data processing platform 102 may perform a rule-based pre-processing procedure, a clustering-based pre-processing procedure, and/or the like to curate and/or transform the training data. In some implementations, data processing platform 102 may apply one or more training data modification filtering rules to perform rule-based pre-processing. For example, data processing platform 102 may apply one or more rules regarding a type of data that is to be received as training data, and may perform one or more procedures to enforce the one or more rules, such as performing a space trimming procedure, a case lowering procedure, a stop-words removal procedure, and/or the like.

In some implementations, data processing platform 102 may use one or more regular expressions for filtering of the training data. For example, data processing platform 102 may use a stored regular expression or may provide a user interface for receiving a regular expression to apply to the training data. In this case, data processing platform 102 may parse the training data to determine if a data entry has a regular expression pattern matching a particular regular expression that is configured for data filtering and may filter the data entry accordingly. For example, data processing platform 102 may determine, based on a regular expression, that a data entry is of a particular type that is to be removed from use in training a machine learning model, such as user identification information, confidential information, and/or the like.

In some implementations, data processing platform 102 may generate a set of clusters using the training data to perform a cluster analysis. For example, data processing platform 102 may generate the set of clusters and may identify outlier data based on the set of clusters. In this case, data processing platform 102 may automatically transform the training data by removing or altering the outlier data. In this way, data processing platform 102 reduces data deficiencies, thereby increasing an accuracy of a machine learning model generated based on the training data. Additionally, or alternatively, data processing platform 102 may provide a user interface with which to receive input associated with removing or altering the outlier data. In this case, after receiving user input to, for example, remove a data entry, data processing platform 102 may update the set of clusters and may provide updated information identifying outlier data for automatic removal, automatic alteration, user-input based removal, user-input based alteration, and/or the like. In this way, data processing platform 102 may iteratively provide contextual information regarding the training data to enable user-customization of the training data.

In some implementations, data processing platform 102 may generate a set of labels for the training data. For example, data processing platform 102 may apply labels to data entries based on the training data and/or may apply labels to clusters of data entries based on generating a set of clusters of data entries. In this case, data processing platform 102 may enable filtering of labeled data, chaining of filtered labeled data, and/or the like to enable data curation, as described in more detail herein. As an example, for trouble ticket training data, data processing platform 102 may predict a first subset of training data as relating to human error, a second subset of training data as relating to a training issue, a third subset of data relating to a process issue, a fourth subset of data as relating to a configuration issue, a fifth subset of data as relating to an application issue, and/or the like. In this case, data processing platform 102 may enable filtering by label to enable determination of whether data within any particular label is outlier data. Moreover, data processing platform 102 may chain together a plurality of filters to provide a multi-dimensional view of a subset of training data. Furthermore, data processing platform 102 may enable analysis of chained labels that, individually, do not have a threshold quantity of data entries, but collectively include a threshold quantity of data entries, as described in more detail herein. In this way, data processing platform 102 improves an accuracy of machine learning models trained using the chained labels, relative to machine learning models trained using labels with less than the threshold quantity of data entries.

In some implementations, data processing platform 102 may generate a clustering index value. For example, data processing platform 102 may determine a result of an equation:

$$C_j = \left( \sum_{i=0}^{n} \frac{(m_{ij})^2}{m_i} \right) * \frac{1}{m_j}$$

where $C_j$ represents a mean clustering index of a class j, n represents a quantity of clusters, $m_{ij}$ represents an amount of data in class j in a cluster I, $m_i$ represents an amount of data (e.g., trouble tickets) in a cluster I, and $m_j$ represents an amount of data in class j. In this case, data processing platform 102 may determine a data risk value (e.g., which may be a categorical value, such as low risk, medium risk, high risk, and/or the like) based on the clustering index value. For example, data processing platform 102 may determine that a data set within the training data with a relatively high data purity may be classified as a low risk data set, whereas a data set with a relatively low data purity may be classified as a high risk data set). In other words, a high risk data set may be determined to result in a lower accuracy model relative to a low risk data set. In this case, data processing platform 102 classifies the data set to enable selection of a low risk portion of the data set for training one or more models, resulting in a higher accuracy of the one or more models.

In some implementations, data processing platform 102 may alter a parameter of the training data set based on determining the data purity and data risk. For example, data processing platform 102 may determine to omit a column of data classified as high risk and/or low purity from use in training a machine learning model. In this way, data processing platform 102 reduces processing to generate the machine learning model and improves accuracy of the machine learning model. In some implementations, data processing platform 102 may alter labels of data based on the data purity and/or data risk determination. For example, for a particular cluster of data entries that includes greater than a threshold percentage of data entries of a first label that is calculated as low data risk and less than another threshold percentage of outlier data entries with other labels calculated as high data risk, data processing platform 102 may alter and/or re-label the outlier data entries to have the first label. In this way, data processing platform 102 may de-noise the training data, thereby improving machine learning based on the training data. Additionally, or alternatively, data processing platform 102 may tag other data entries with the first label as being a part of the particular cluster based on having the first label and the particular cluster being correlated to the first label.

In some implementations, data processing platform 102 may determine a balance metric for a dataset. For example, data processing platform 102 may determine whether the dataset has a threshold imbalance, a threshold skew of an attribute, and/or the like. In this case, data processing platform 102 may determine a data quality based on the balance metric and for different types of data (e.g., integer data, categorical data, date data, identifier data, text data, and/or the like). In this case, data processing platform 102 may provide information identifying the data quality as output, may automatically select a subset of the training data for use in machine learning to ensure a threshold level of data quality in data selected for the machine learning, and/or the like.

In some implementations, data processing platform 102 may perform one or more other data processing procedures. For example, data processing platform 102 may perform a stop word extraction procedure (e.g., using regular expression algorithms) to enable natural language entry of training data and stripping of non-semantic aspects of the training data (e.g., the stop words). In some implementations, data processing platform 102 may perform a variable stripping functionality. For example, data processing platform 102 may strip information, such as contact information, account number information, address information, and name information from a training set to sanitize the training set. In this case, data processing platform 102 may generate a data structure storing a lexicon generated from the stripped information to enable subsequent enrichment of the training data after pre-processing. For example, when using a machine learning model for ticket management, data processing platform 102 may strip contact information from a training data set to enable prediction of information relating to the ticket and store the contact information in a lexicon for subsequent use in automatically responding to the ticket using the contact information.

In some implementations, data processing platform 102 may automatically identify a data type of a data entry in the training data. For example, data processing platform 102 may identify the data type based on a word count in a data entry, a rate of uniqueness of values in a set of data entries, a determination of whether an attribute value in a data entry matches a regular expression, and/or the like. In this way, data processing platform 102 may identify categorical data, identifier data, textual data, and/or the like.

In some implementations, data processing platform 102 may use an association technique to account for multi-collinearity of attributes. For example, data processing platform 102 may use an integer to integer (e.g., Pearson r Correlation) association technique to measure a degree of a relationship between linearly related variables. Additionally, or alternatively, data processing platform 102 may determine a category to integer (e.g., an eta Ration or correlation ratio) value to determine an extent of a non-linearity of a relationship between variables. Additionally, or alternatively, data processing platform 102 may determine a scale of attributes (e.g., a nominal scale, an ordinal scale, an interval scale, and a ratio scale). In this way, data processing platform 102 may reduce a variance of coefficient estimates and de-sensitize subsequent machine learning models to minor changes in data values.

In some implementations, data processing platform 102 may label one or more data entries that are missing labels. For example, based on the rule-based pre-processing and the clustering processing, data processing platform 102 may identify a set of labels for one or more data entries for which labels are missing (e.g., based on other data entries in a same cluster, identified by a same regular expression, and/or the like). In some implementations, data processing platform 102 may determine the labels based on a cluster. For example, data processing platform 102 may determine that a particular data entry in a cluster is representative of the cluster based on a clustering algorithm, and may assign a label to the cluster and/or data entries thereof based on the particular data entry. In some implementations, data processing platform 102 may determine a set of scores when determining labels. For example, for a group of data points within a cluster, data processing platform 102 may determine a resolution matrix (e.g., in which a clustering algorithm is used to evaluate a plurality of data columns including sets of data entries). In this case, based on the resolution matrix, data processing platform 102 may determine:

$$FirstGrade_{rowRatio} = \frac{IDBTC}{TDCND_2}$$

where IDBTC represents a quantity of intersected datapoints between two clusters, $TDCND_2$ represents a quantity of datapoints in a cluster number of a second data column, and $FirstGrade_{rowRatio}$ represents a row ratio of a first grade. Similarly, data processing platform 102 may determine:

$$FirstGrade_{colRatio} = \frac{IDBTC}{TDCND_1}$$

where $TDCND_1$ represents a quantity of datapoints in a cluster number of a first data column and $FirstGrade_{colRatio}$ represents a column ratio of a first grade. Based on the first grade ratios, data processing platform 102 may assign a score based on a tiering (e.g., a ratio of 0-10 may be a first tier, a ratio of 10-20 may be a second tier, and/or the like), and may determine a first grade score based on a sum of the scores for the row ratio and the column ratio.

Additionally, or alternatively, for data points within a group, data processing platform 102 may determine a second grade score:

$$SecondGrade_{Ratio} = \frac{IDBTC}{TDCND}$$

where $SecondGrade_{Ratio}$ represents a ratio for a second grade and TDCND represents a total quantity of datapoints in a data set. In this case, data processing platform 102 may assign a second grade score based on a tier relating to a quantity of intersected data points. In some implementations, data processing platform 102 may determine a sum of the first grade score and the second grade score to determine a total score, and may assign an importance to data entries based on the total score (e.g., based on tiers of total scores). In some implementations, based on determining the total score, data processing platform 102 may assign and/or recommend a label for a cluster of data points, a group of data points, and/or the like. In some implementations, data processing platform 102 may use machine learning to perform at least a portion of data pre-processing and filtering. For example, data processing platform 102 may use an unsupervised machine learning algorithm to enable data cleaning, data set alteration, labeling, and/or the like.

In some implementations, based on using unsupervised machine learning, data processing platform 102 may further transform the training data when curating the training data. For example, data processing platform 102 may automatically adjust missing values, remove skewness of the data (e.g., using logarithmic, normalization, standardization, and/or the like techniques), add labels to the data, filter attributes of the data, remove or alter outliers in the data, and/or the like to improve a data quality of data used for machine learning.

In some implementations, data processing platform 102 may generate synthetic data points to transform the training data. For example, data processing platform 102 may use an oversampling technique to generate synthetic examples for the training data set, to avoid under-sampled classes and/or clusters within the training data. Additionally, or alternatively, data processing platform 102 may perform a binning procedure to merge two or more under-sampled classes and/or clusters within the training data to create a single class or cluster with a threshold quantity of samples, thereby balancing the data and improving an accuracy of a subsequently generated machine learning model.

As further shown in FIG. 1A, and by reference number 154, data processing platform 102 may provide curated training data. For example, data processing platform 102 may provide the curated training data to model selection platform 104. In some implementations, data processing platform 102 may provide the curated training data as output for display via a user interface. For example, data processing platform 102 may provide a user interface to enable a user to view data entries for which a label is recommended, to view data entries determined to be at risk of being erroneous (e.g., to enable a user to confirm a recommendation and/or provide a correction to the data entries), and/or the like. In some implementations, data processing platform 102 may generate a recommendation relating to the curated training data based on processing the training data. For example, data processing platform 102 may generate a recommendation to omit high risk data from being used for training a machine learning model, to correct one or more sets of data entries before training a machine learning model, and/or the like.

As shown in FIG. 1B, and by reference number 156, model selection platform 104 may obtain algorithms for a set of types of machine learning models from model repository 110. For example, model selection platform 104 may obtain stored algorithms representing classification models (e.g., a random forest classifier model, a k-nearest neighbors model, a decision tree model, a multilayer perceptron model, a stochastic gradient descent classifier model, a logistic regression model, a linear support vector classifier model, a naïve Bayes model, a gradient boosting model, and/or the like), regression models (e.g., a ridge regression model), deep learning classification models (e.g., a convolutional neural network model, an Inception V3 model, and/or the like), and/or the like.

As further shown in FIG. 1B, and by reference number 158, model selection platform 104 may automatically select, train, and deploy a particular machine learning model of the set of possible machine learning models. For example, model selection platform 104 may classify a task type, select a machine learning model category for the task type, select a machine learning model type from the model category, tune parameters of the machine learning model, and train the machine learning model.

In some implementations, model selection platform 104 may determine one or more parameters relating to deploying a particular type of machine learning model. For example, model selection platform 104 may determine that the training data relates to a classification task, a regression task, and/or the like, and may filter the set of types of machine learning models based on the type of task. In this case, when the task is a classification task, model selection platform 104 may omit one or more regression machine learning models from a machine learning model selection procedure. Additionally, or alternatively, model selection platform 104 may determine that a task is a natural language processing task, an image processing task, a computer vision task, and/or the like. In this case, model selection platform 104 may omit machine learning models for image processing from determinations for natural language processing tasks, omit machine learning models for natural language processing from image processing tasks, and/or the like. In some implementations, model selection platform 104 may define one or more use cases for a machine learning model, define one or more inputs or outputs for the machine learning model, and/or the like to enable selection of a machine learning model.

In some implementations, model selection platform 104 may determine to modify an existing machine learning model. For example, based on obtaining information identifying a set of types of machine learning models and the information identifying a task type (e.g., a service management task, an Information Technology (IT) task, an application development task, a service transition task, and/or the like) model selection platform 104 may determine that a machine learning model is deployed for the same task, for a similar task (e.g., based on a similarity score calculated based on training data parameters), and/or the like. In this case, model selection platform 104 may determine to modify the existing machine learning model (e.g., by retraining the machine learning model on new training data).

Additionally, or alternatively, model selection platform 104 may determine to establish a machine learning model based on an existing template or to create a new machine learning model based on information regarding the set of types of machine learning models. In some implementations, model selection platform 104 may determine that an existing model is deployed via a webservice to complete the task for which the training data is provided. In this case, model selection platform 104 may provide output identifying the webservice to enable a user to use the existing model, thereby reducing a likelihood of duplicative model generation.

In some implementations, model selection platform 104 may provide a user interface to identify a set of scenarios relating to a set of types of machine learning models. For example, model selection platform 104 may provide information identifying results from test data applied to a set of types of machine learning models to provide information, to a user, regarding how each type of machine learning model may respond to a scenario. In some implementations, model selection platform 104 may determine local feature weights of features for prediction instances associated with the set of types of machine learning models. In this case, model selection platform 104 may use a local interpretable model agnostic explanation (LIME) model to identify an influence of features on the prediction instances of multiple types of machine learning models. In some implementations, model selection platform 104 may automatically select the features for one or more types of machine learning model. For example, based on the data curation, model selection platform 104 may identify low risk data entries and associated variables to use as features for training a machine learning model. In this way, model selection platform 104 enables user-assisted selection of a machine learning model.

In some implementations, model selection platform 104 may select the particular type of machine learning model based on a hardware criterion. For example, model selection platform 104 may determine hardware of a cloud computing environment of model selection platform 104, and may determine that the hardware is appropriate for a first subset of machine learning models (e.g., SKLearn models) and not appropriate for a second subset of machine learning models (e.g., Tensorflow models). Additionally, or alternatively, model selection platform 104 may identify hardware of another system on which the machine learning model is to be hosted and executed (e.g., a client device, as described herein), and may determine that a subset of machine learning models can be executed on hardware of the other system.

In some implementations, model selection platform 104 may tune hyper parameters in connection with selection of a machine learning model. For example, model selection platform 104 may evaluate a set of types of machine learning models, and may select a particular type of machine learning model with a greatest quantity of optimal hyper parameters. In this way, model selection platform 104 uses hyper parameter optimization to select a machine learning model. Additionally, or alternatively, when a particular type of machine learning model is selected (e.g., using another technique as described herein), model selection platform 104 may automatically tune hyper parameters of the particular machine learning model to enable the particular type of machine learning model to perform predictions using subsequent prediction data. In some implementations, to identify best estimated hyper parameters of multiple types of machine learning models, model selection platform 104 may use a tree-structured Parzen estimator to identify best estimated hyper parameters within a high dimensional search space of parameters of the multiple types of machine learning models. In this way, model selection platform 104 may enable selection from multiple types of machine learning models with multiple sets of parameters and a high dimensional search space.

In some implementations, model selection platform 104 may determine a score (e.g., based on tuning hyper parameters), and may select a particular type of machine learning model based on the score. For example, model selection platform 104 may determine a test accuracy score (e.g., an F1 score), a positive predictive value score (e.g., a precision score), a sensitivity score (e.g., a recall score), and/or the like. Additionally, or alternatively, model selection platform 104 may determine a timeline of a model's performance at evaluating training data, and may select a particular type of machine learning model based on a score, the timeline, and/or the like. In some implementations, model selection platform 104 may provide a user interface to visualize results of testing a set of different types of machine learning models (e.g., a set of hyper parameters, a timeline of model performance, a score, and/or the like).

In some implementations, model selection platform 104 may use a multi-node pipeline to train a selected type of machine learning model. For example, model selection platform 104 may divide a training data set into multiple subsets using a routing key, and may distribute the multiple subsets to multiple systems to train separate machine learning models of the selected type of machine learning model. In this case, when a prediction is to be performed using prediction data, model selection platform 104 may decompose the prediction data, extract the routing key, and use the routing key to forward the decomposed prediction data to a corresponding machine learning model of the multiple separate machine learning models. Further, model selection platform 104 may receive a prediction from the corresponding machine learning model and may provide the prediction as output. In some implementations, model selection platform 104 may select the routing key based on a data column of a dataset (e.g., the training data). In this way, model selection platform 104 reduces a processing resource requirement by replacing a single, computationally large machine learning model with multiple, distributed, computationally small machine learning models. Moreover, model selection platform 104 enables deployment of a machine learning model to other systems with reduced processing capabilities by enabling chaining of multiple of the other systems together to provide distributed computing functionalities.

In some implementations, model selection platform 104 may use a chain model pipeline to train a selected type of machine learning model. For example, model selection platform 104 may identify a first subset of data entries and a second subset of data entries that are to be used as features to predict an output. In this case, model selection platform 104 the first subset of data entries may be determined to be of poor quality (e.g., a threshold percentage of the first subset of data entries are missing) and the second subset of data entries may be determined to be predictive of the first subset of data entries. In this case, model selection platform 104 may use the second subset of data entries to predict one or more of the first subset of data entries that are missing, and may use the second subset of data entries and the completed first subset of data entries to predict the output. In some implementations, model selection platform 104 may use additional quantities of features for data completion, for output prediction, and/or the like.

In some implementations, model selection platform 104 may train a particular type of machine learning model for a particular language. For example, model selection platform 104 may train an English language machine learning model. In some implementations, model selection platform 104 may train multiple machine learning models for multiple languages. For example, model selection platform 104 may train a first machine learning model for English language input and a second machine learning model for Japanese language input. In this case, model selection platform 104 may train a classification model to determine a language of an input and route the input to a corresponding machine learning model of multiple trained machine learning models.

As further shown in FIG. 1B, and by reference number 160, model selection platform 104 may deploy a webservice for a particular type of machine learning model. For example, based on selecting and training the particular type of machine learning model, model selection platform 104 may select a webservice, configure the webservice for the particular type of machine learning model, provision resources for the webservice based on a type of the particular type of machine learning model, and deploy the webservice to provide access to the particular machine learning model. In some implementations, model selection platform 104 may notify one or more other devices (e.g., client devices, as described herein) that the particular machine learning model is deployed. In some implementations, model selection platform 104 may establish a dynamic application programming interface (API) with user-case reference identifier mapping to the particular machine learning model, and may provide information identifying the dynamic API to one or more other devices, to enable the one or more other devices to provide prediction data from which to generate a prediction.

In some implementations, model selection platform 104 may retrain the particular type of machine learning model (e.g., after selecting the particular type of machine learning model) for deployment, during deployment, and/or the like. For example, for a static machine learning model, model selection platform 104 may retrain the machine learning model when a new set of training data becomes available (e.g., based on monitoring one or more data sources). Additionally, or alternatively, for a continuous machine learning model, model selection platform 104 may select a threshold amount of new data upon which to retrain the machine learning model (e.g., 1 new data entry, 100 new data entries, and/or the like).

As shown in FIG. 1C, and by reference number 162, client device 106 may receive prediction data. For example, client device 106 may receive information (e.g., via input via a user interface, based on monitoring another device, and/or the like) from which to perform a prediction using the particular type of machine learning model.

As further shown in FIG. 1C, and by reference number 164, client device 106 may access the webservice to use the particular type of machine learning model to perform a prediction. For example, client device 106 may provide the prediction data for processing using the particular type of machine learning model in the cloud computing environment, and may receive an indication of a prediction as a response. In some implementations, client device 106 may provide the prediction data in connection with a reference identifier for the particular type of machine learning model, to enable model selection platform 104 to access the particular type of machine learning model to perform a prediction.

As further shown in FIG. 1C, and by reference number 166, client device 106 may provide a machine learning model prediction as output. For example, based on receiving information from, for example, model selection platform 104 in the cloud computing environment, client device 106 may provide an indication of the prediction via a user interface.

As indicated above, FIGS. 1A-1C are provided merely as one or more examples. Other examples may differ from what is described with regard to FIGS. 1A-1C.

Figure 2:
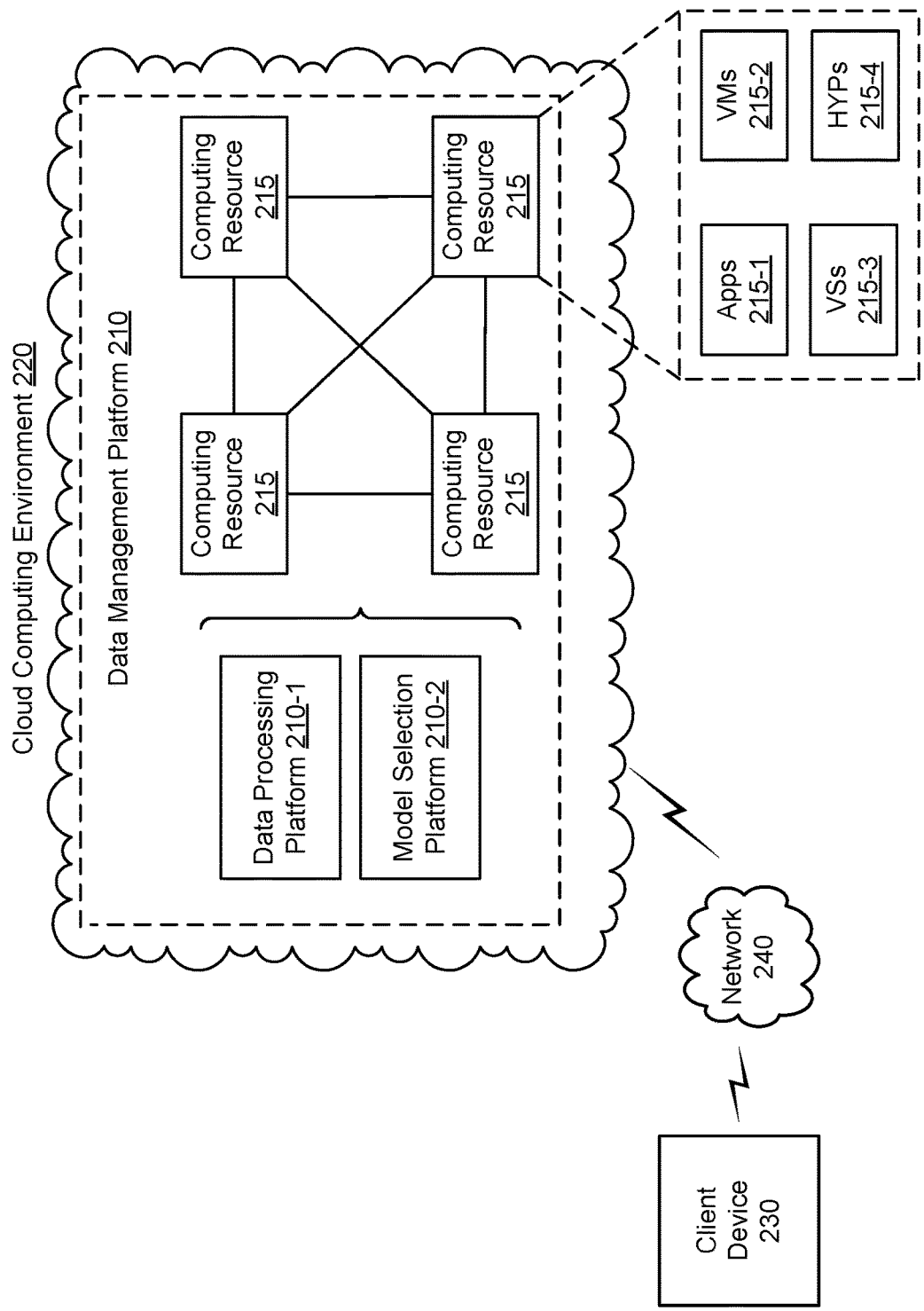
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 230, a data management platform 210, a data processing platform 210-1, a model selection platform 210-2, a computing resource 215, a cloud computing environment 220, and a network 240. Devices of environment 200 may interconnect via wired connections, wireless connections, or a combination of wired and wireless connections.

Data management platform 210 includes one or more computing resources assigned to perform automated data processing and machine learning model generation. For example, data management platform 210 may be a platform implemented by cloud computing environment 220 that may perform automated data processing and machine learning model generation. In some implementations, data management platform 210 is implemented by computing resources 215 of cloud computing environment 220. In some implementations, data management platform 210 may include a data processing platform 210-1 and a model selection platform 210-2. In some implementations, data management platform 210 may provide, via an API of a webservice, access to a machine learning model selected and trained using data management platform 210.

Data management platform 210 may include a server device or a group of server devices. In some implementations, data management platform 210 may be hosted in cloud computing environment 220. Notably, while implementations described herein may describe data management platform 210 as being hosted in cloud computing environment 220, in some implementations, data management platform 210 may be non-cloud-based or may be partially cloud-based.

Cloud computing environment 220 includes an environment that delivers computing as a service, whereby shared resources, services, and/or the like may be provided to perform automated data processing and machine learning model generation. Cloud computing environment 220 may provide computation, software, data access, storage, and/or other services that do not require end-user knowledge of a physical location and configuration of a system and/or a device that delivers the services. As shown, cloud computing environment 220 may include a data management platform 210, a data processing platform 210-1, a model selection platform 210-2, and a computing resource 215.

Computing resource 215 includes one or more personal computers, workstation computers, server devices, or another type of computation and/or communication device. In some implementations, computing resource 215 may host data management platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by client device 230. Application 215-1 may eliminate a need to install and execute the software applications on client device 230. For example, application 215-1 may include software associated with data management platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., client device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the "guest operating systems" and may manage the execution of the guest operating systems. Multiple instances of a variety of operating systems may share virtualized hardware resources.

Client device 230 includes one or more devices capable of receiving, generating, storing, processing, and/or providing information associated with automated data processing and machine learning model generation. For example, client device 230 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
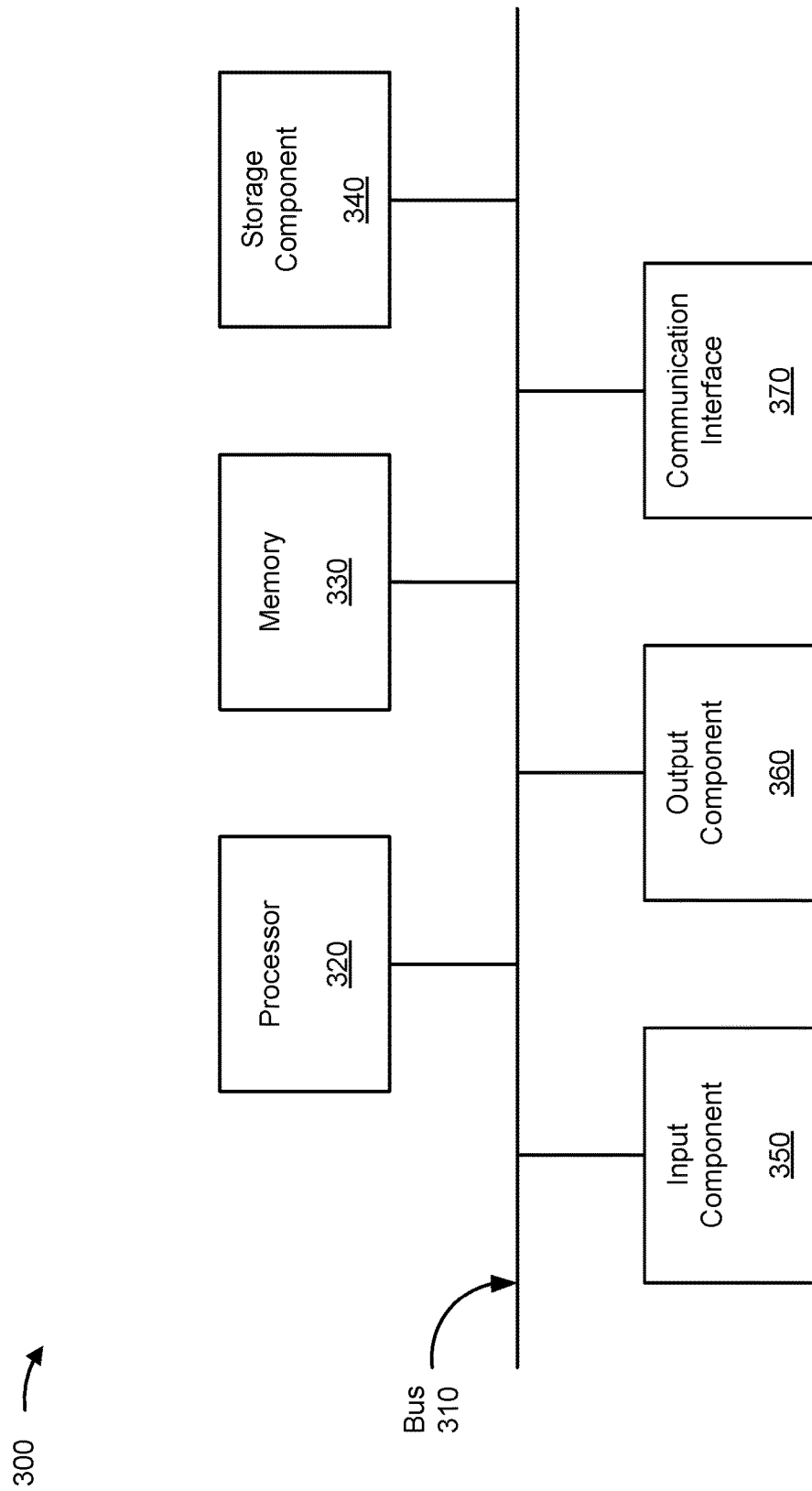
FIG. 3 is a diagram of example components of one or more devices of FIG. 2.

FIG. 3 is a diagram of example components of a device 300. Device 300 may correspond to data management platform 210, data processing platform 210-1, model selection platform 210-2, computing resource 215, and/or client device 230. In some implementations, data management platform 210, data processing platform 210-1, model selection platform 210-2, computing resource 215, and/or client device 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
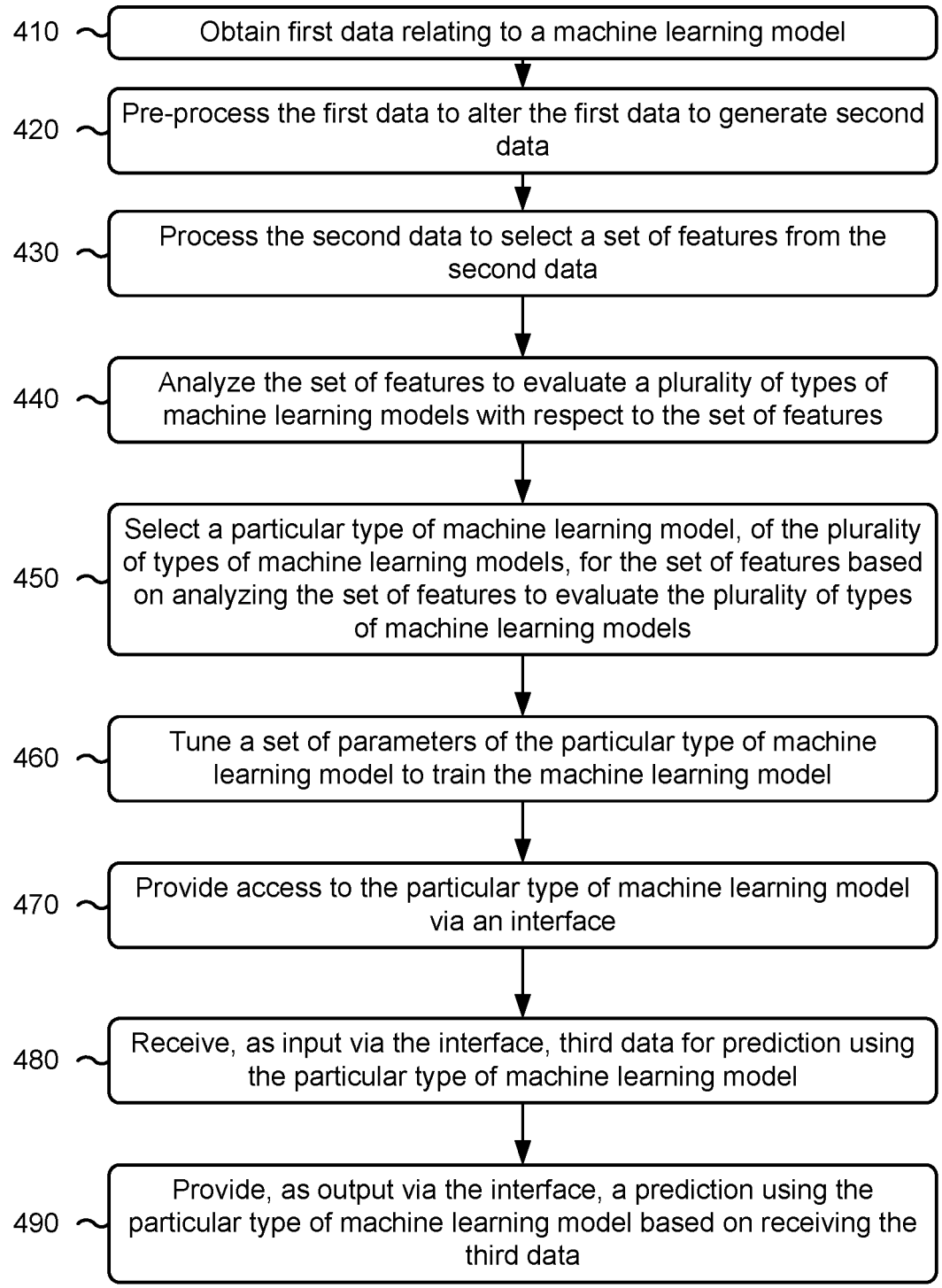
FIGS. 4-6 are flow charts of example processes for automated data processing and machine learning model generation.

FIG. 4 is a flow chart of an example process 400 for automated data processing and machine learning model generation. In some implementations, one or more process blocks of FIG. 4 may be performed by a data management platform (e.g., data management platform 210). In some implementations, one or more process blocks of FIG. 4 may be performed by another device or a group of devices separate from or including the data management platform, such as a data processing platform (e.g., data processing platform 210-1), a model selection platform (e.g., model selection platform 210-2), a computing resource (e.g., computing resource 215), a client device (e.g., client device 230), and/or the like.

As shown in FIG. 4, process 400 may include obtaining first data relating to a machine learning model (block 410). For example, the data management platform (e.g., using processor 320, memory 330, storage component 340, input component 350, output component 360, communication interface 370 and/or the like) may obtain first data relating to a machine learning model, as described above.

As shown in FIG. 4, process 400 may include pre-processing the first data to alter the first data to generate second data (block 420). For example, the data management platform (e.g., using processor 320, memory 330, storage component 340, input component 350, output component 360, communication interface 370 and/or the like) may pre-process the first data to alter the first data to generate second data, as described above.

As further shown in FIG. 4, process 400 may include processing the second data to select a set of features from the second data (block 430). For example, the data management platform (e.g., using processor 320, memory 330, storage component 340, input component 350, output component 360, communication interface 370 and/or the like) may process the second data to select a set of features from the second data, as described above.

As further shown in FIG. 4, process 400 may include analyzing the set of features to evaluate a plurality of types of machine learning models with respect to the set of features (block 440). For example, the data management platform (e.g., using processor 320, memory 330, storage component 340, input component 350, output component 360, communication interface 370 and/or the like) may analyze the set of features to evaluate a plurality of types of machine learning models with respect to the set of features, as described above.

As further shown in FIG. 4, process 400 may include selecting a particular type of machine learning model, of the plurality of types of machine learning models, for the set of features, based on analyzing the set of features to evaluate the plurality of types of machine learning models (block 450). For example, the data management platform (e.g., using processor 320, memory 330, storage component 340, input component 350, output component 360, communication interface 370 and/or the like) may select a particular type of machine learning model, of the plurality of types of machine learning models, for the set of features, based on analyzing the set of features to evaluate the plurality of types of machine learning models, as described above.

As further shown in FIG. 4, process 400 may include tuning a set of parameters of the particular type of machine learning model, to train the machine learning model (block 460). For example, the data management platform (e.g., using processor 320, memory 330, storage component 340, input component 350, output component 360, communication interface 370 and/or the like) may tune a set of parameters of the particular type of machine learning model, to train the machine learning model, as described above.

As further shown in FIG. 4, process 400 may include providing access to the particular type of machine learning model via an interface (block 470). For example, the data management platform (e.g., using processor 320, memory 330, storage component 340, input component 350, output component 360, communication interface 370 and/or the like) may provide access to the particular type of machine learning model via an interface, as described above.

As further shown in FIG. 4, process 400 may include receiving, as input via the interface, third data for prediction using the particular type of machine learning model (block 480). For example, the data management platform (e.g., using processor 320, memory 330, storage component 340, input component 350, output component 360, communication interface 370 and/or the like) may receive, as input via the interface, third data for prediction using the particular type of machine learning model, as described above.

As further shown in FIG. 4, process 400 may include providing, as output via the interface, a prediction using the particular type of machine learning model based on receiving the third data (block 490). For example, the data management platform (e.g., using processor 320, memory 330, storage component 340, input component 350, output component 360, communication interface 370 and/or the like) may provide, as output via the interface, a prediction using the particular type of machine learning model based on receiving the third data, as described above.

Process 400 may include additional implementations, such as any single implementation or any combination of implementations described below and/or in connection with one or more other processes described elsewhere herein.

In a first implementation, processing the second data includes identifying a plurality of features of the second data, and performing a feature reduction procedure to identify the set of features from the plurality of features of the second data.

In a second implementation, alone or in combination with the first implementation, analyzing the set of features to evaluate a plurality of types of machine learning models with respect to the set of features includes classifying the plurality of types of machine learning models based on a type of problem associated with the first data.

In a third implementation, alone or in combination with one or more of the first and second implementations, analyzing the set of features to evaluate a plurality of types of machine learning models with respect to the set of features includes automatically optimizing hyper parameters of the plurality of types of machine learning models to attempt to optimize the plurality of types of machine learning models.

In a fourth implementation, alone or in combination with one or more of the first through third implementations, analyzing the set of features to evaluate a plurality of types of machine learning models with respect to the set of features includes providing, via a user interface, a visualization of model performance of the plurality of types of machine learning models, and receiving, via the user interface, a selection of the particular type of machine learning model based on providing the visualization of the model performance of the plurality of types of machine learning models.

In a fifth implementation, alone or in combination with one or more of the first through fourth implementations, tuning the set of parameters of the particular type of machine learning model includes optimizing hyper parameters of the particular type of machine learning model, and retraining the machine learning model based on optimizing the hyper parameters of the machine learning model.

In a sixth implementation, alone or in combination with one or more of the first through fifth implementations, providing access to the particular type of machine learning model via the interface includes deploying the particular type of machine learning model as a webservice for a plurality of client instances, and notifying a plurality of external applications based on deploying the particular type of machine learning model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
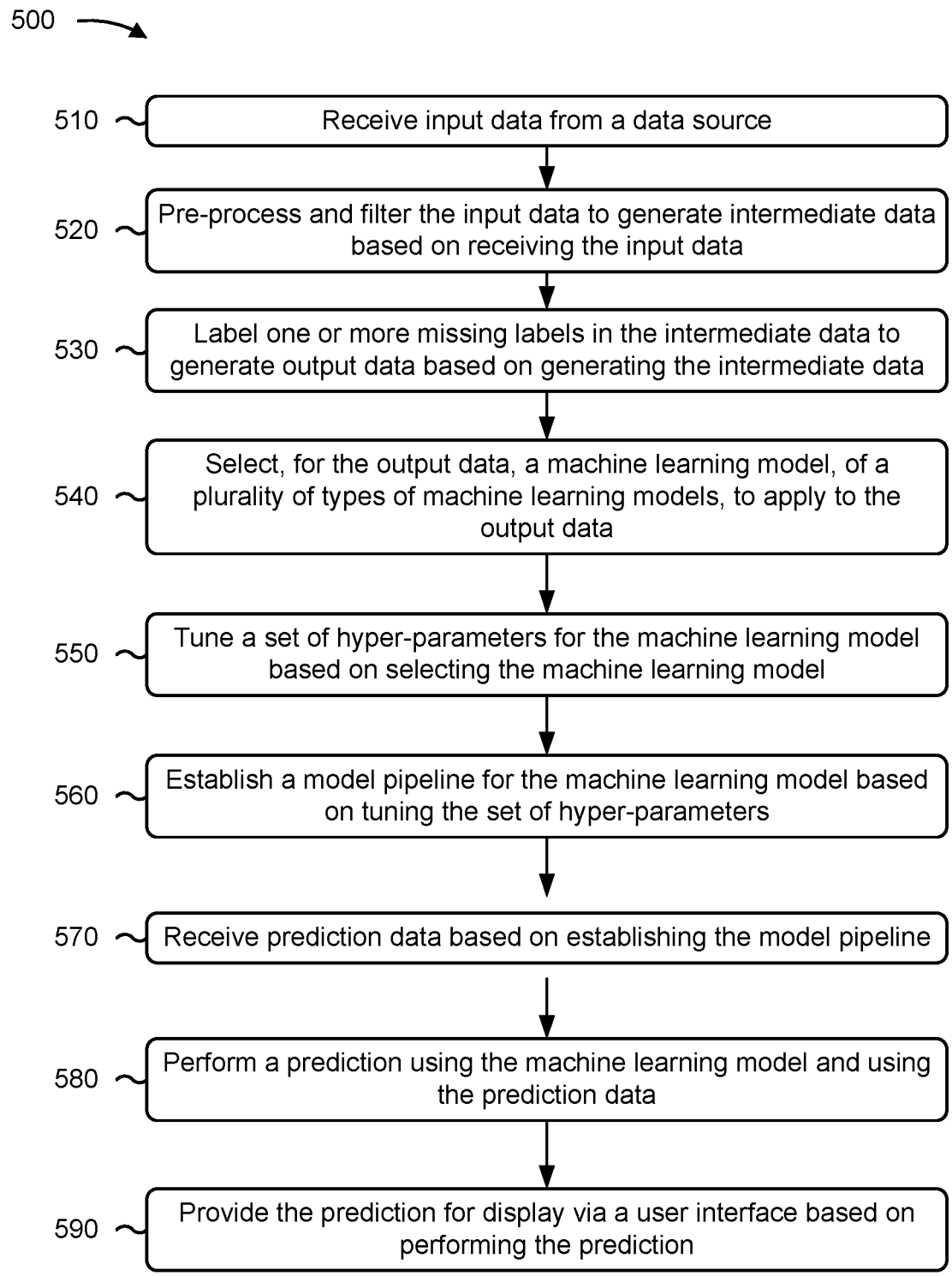

FIG. 5 is a flow chart of an example process 500 for automated data processing and machine learning model generation. In some implementations, one or more process blocks of FIG. 5 may be performed by a data management platform (e.g., data management platform 210). In some implementations, one or more process blocks of FIG. 5 may be performed by another device or a group of devices separate from or including the data management platform, such as a data processing platform (e.g., data processing platform 210-1), a model selection platform (e.g., model selection platform 210-2), a computing resource (e.g., computing resource 215), a client device (e.g., client device 230), and/or the like.

As shown in FIG. 5, process 500 may include receiving input data from a data source (block 510). For example, the data management platform (e.g., using processor 320, memory 330, storage component 340, input component 350, output component 360, communication interface 370 and/or the like) may receive input data from a data source, as described above.

As shown in FIG. 5, process 500 may include pre-processing and filtering the input data to generate intermediate data based on receiving the input data (block 520). For example, the data management platform (e.g., using processor 320, memory 330, storage component 340, input component 350, output component 360, communication interface 370 and/or the like) may pre-process and filter the input data to generate intermediate data based on receiving the input data, as described above.

As shown in FIG. 5, process 500 may include labeling one or more missing labels in the intermediate data to generate output data based on generating the intermediate data (block 530). For example, the data management platform (e.g., using processor 320, memory 330, storage component 340, input component 350, output component 360, communication interface 370 and/or the like) may label one or more missing labels in the intermediate data to generate output data based on generating the intermediate data, as described above.

As further shown in FIG. 5, process 500 may include selecting, for the output data, a machine learning model, of a plurality of types of machine learning models, to apply to the output data (block 540). For example, the data management platform (e.g., using processor 320, memory 330, storage component 340, input component 350, output component 360, communication interface 370 and/or the like)

may select, for the output data, a machine learning model, of a plurality of types of machine learning models, to apply to the output data, as described above.

As further shown in FIG. 5, process 500 may include tuning a set of hyper-parameters for the machine learning model based on selecting the machine learning model (block 550). For example, the data management platform (e.g., using processor 320, memory 330, storage component 340, input component 350, output component 360, communication interface 370 and/or the like) may tune a set of hyper-parameters for the machine learning model based on selecting the machine learning model, as described above.

As further shown in FIG. 5, process 500 may include establishing a model pipeline for the machine learning model based on tuning the set of hyper-parameters (block 560). For example, the data management platform (e.g., using processor 320, memory 330, storage component 340, input component 350, output component 360, communication interface 370 and/or the like) may establish a model pipeline for the machine learning model based on tuning the set of hyper-parameters, as described above.

As further shown in FIG. 5, process 500 may include receiving prediction data based on establishing the model pipeline (block 570). For example, the data management platform (e.g., using processor 320, memory 330, storage component 340, input component 350, output component 360, communication interface 370 and/or the like) may receive prediction data based on establishing the model pipeline, as described above.

As further shown in FIG. 5, process 500 may include performing a prediction using the machine learning model and using the prediction data (block 580). For example, the data management platform (e.g., using processor 320, memory 330, storage component 340, input component 350, output component 360, communication interface 370 and/or the like) may perform a prediction using the machine learning model and using the prediction data, as described above.

As further shown in FIG. 5, process 500 may include providing the prediction for display via a user interface based on performing the prediction (block 590). For example, the data management platform (e.g., using processor 320, memory 330, storage component 340, input component 350, output component 360, communication interface 370 and/or the like) may provide the prediction for display via a user interface based on performing the prediction, as described above.

Process 500 may include additional implementations, such as any single implementation or any combination of implementations described below and/or in connection with one or more other processes described elsewhere herein.

In a first implementation, the input data is associated with a plurality of languages, and process 500 includes identifying the plurality of languages, and training, for the machine learning model, a plurality of sub-models for the plurality of languages.

In a second implementation, alone or in combination with the first implementation, the machine learning model is a natural language processing model or a computer vision model.

In a third implementation, alone or in combination with one or more of the first and second implementations, the prediction data is a first subset of a text entry and the prediction is a second subset of the text entry.

In a fourth implementation, alone or in combination with one or more of the first through third implementations, process 500 may include performing a cluster analysis on the input data, wherein the cluster analysis is associated with a data purity or a data risk associated with the input data; providing, via the user interface, a result of the cluster analysis; and determining a modification to the input data based on providing the result of the cluster analysis via the user interface.

In a fifth implementation, alone or in combination with one or more of the first through fourth implementations, the cluster analysis identifies a plurality of predicted sources of error in the input data.

In a sixth implementation, alone or in combination with one or more of the first through fifth implementations, the one or more processors, when pre-processing and filtering the input data, are configured to perform at least one of a space-trimming procedure, a case lowering procedure, a stop words removal procedure, a Boolean logic filtering procedure, or a regular expression pattern matching procedure.

In a seventh implementation, alone or in combination with one or more of the first through sixth implementations, the plurality of types of machine learning models includes at least one of a random forest classifier model, a k-nearest neighbor model, a decision tree model, a multilayer perceptron model, a stochastic gradient descent classifier model, a logistic regression model, a linear support vector classifier model, a naïve Bayes model, a ridge regression model, a convolutional neural network model, or an Inception v3 model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
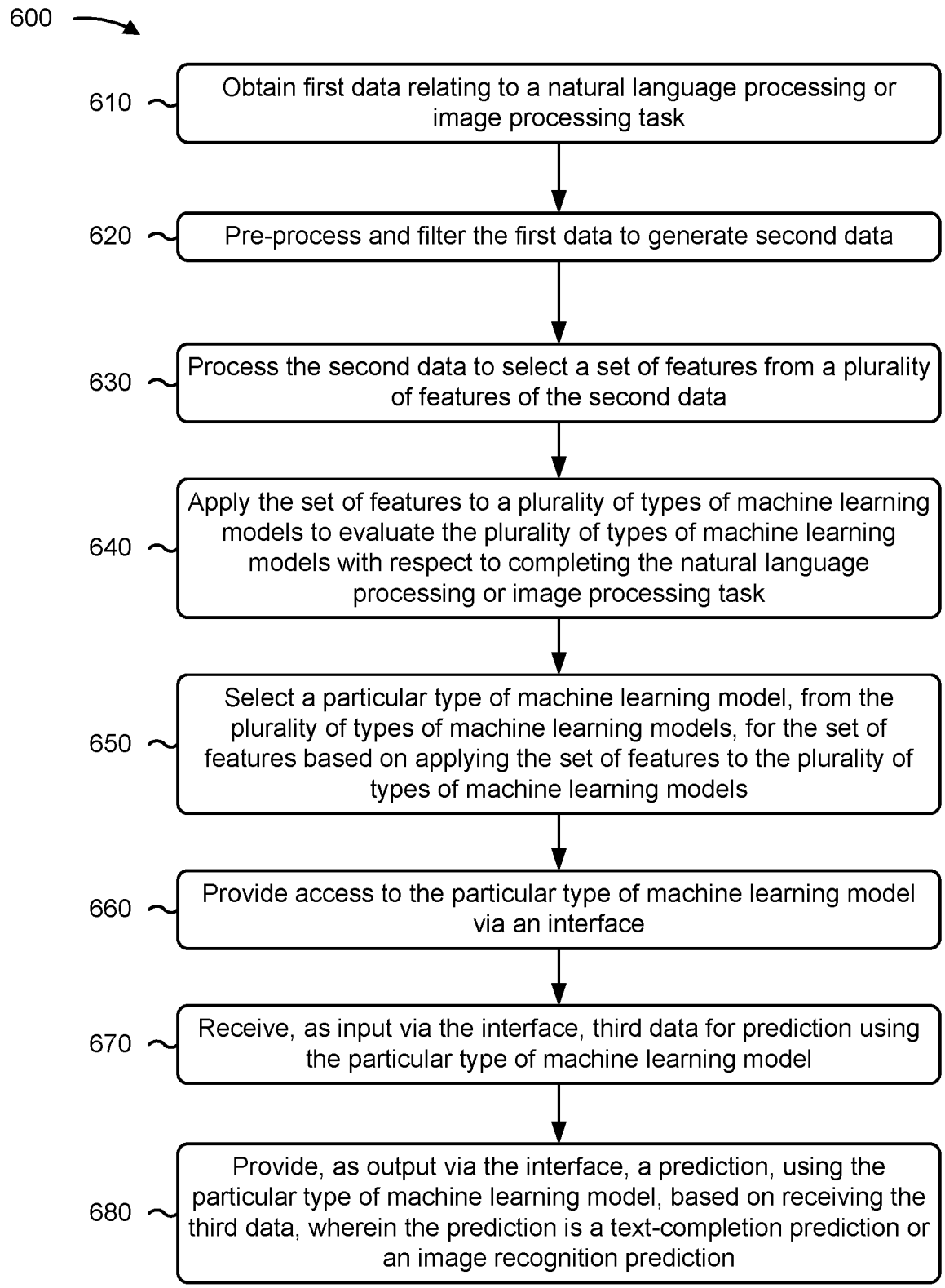

FIG. 6 is a flow chart of an example process 600 for automated data processing and machine learning model generation. In some implementations, one or more process blocks of FIG. 6 may be performed by a data management platform (e.g., data management platform 210). In some implementations, one or more process blocks of FIG. 6 may be performed by another device or a group of devices separate from or including the data management platform, such as a data processing platform (e.g., data processing platform 210-1), a model selection platform (e.g., model selection platform 210-2), a computing resource (e.g., computing resource 215), a client device (e.g., client device 230), and/or the like.

As shown in FIG. 6, process 600 may include obtaining first data relating to a natural language processing or image processing task (block 610). For example, the data management platform (e.g., using processor 320, memory 330, storage component 340, input component 350, output component 360, communication interface 370 and/or the like) may obtain first data relating to a natural language processing or image processing task, as described above.

As shown in FIG. 6, process 600 may include pre-processing and filtering the first data to generate second data (block 620). For example, the data management platform (e.g., using processor 320, memory 330, storage component 340, input component 350, output component 360, communication interface 370 and/or the like) may pre-process and filter the first data to generate second data, as described above.

As further shown in FIG. 6, process 600 may include processing the second data to select a set of features from a plurality of features of the second data (block 630). For example, the data management platform (e.g., using processor 320, memory 330, storage component 340, input component 350, output component 360, communication interface 370 and/or the like) may process the second data to select a set of features from a plurality of features of the second data, as described above.

As further shown in FIG. 6, process 600 may include applying the set of features to a plurality of types of machine learning models to evaluate the plurality of types of machine learning models with respect to completing the natural language processing or image processing task (block 640). For example, the data management platform (e.g., using processor 320, memory 330, storage component 340, input component 350, output component 360, communication interface 370 and/or the like) may apply the set of features to a plurality of types of machine learning models to evaluate the plurality of types of machine learning models with respect to completing the natural language processing or image processing task, as described above.

As further shown in FIG. 6, process 600 may include selecting a particular type of machine learning model, from the plurality of types of machine learning models, for the set of features, based on applying the set of features to the plurality of types of machine learning models (block 650). For example, the data management platform (e.g., using processor 320, memory 330, storage component 340, input component 350, output component 360, communication interface 370 and/or the like) may select a particular type of machine learning model, from the plurality of types of machine learning models, for the set of features, based on applying the set of features to the plurality of types of machine learning models, as described above.

As further shown in FIG. 6, process 600 may include providing access to the particular type of machine learning model via an interface (block 660). For example, the data management platform (e.g., using processor 320, memory 330, storage component 340, input component 350, output component 360, communication interface 370 and/or the like) may provide access to the particular type of machine learning model via an interface, as described above.

As further shown in FIG. 6, process 600 may include receiving, as input via the interface, third data for prediction using the particular type of machine learning model (block 670). For example, the data management platform (e.g., using processor 320, memory 330, storage component 340, input component 350, output component 360, communication interface 370 and/or the like) may receive, as input via the interface, third data for prediction using the particular type of machine learning model, as described above.

As further shown in FIG. 6, process 600 may include providing, as output via the interface, a prediction, using the particular type of machine learning model, based on receiving the third data, wherein the prediction is a text-completion prediction or an image recognition prediction (block 680). For example, the data management platform (e.g., using processor 320, memory 330, storage component 340, input component 350, output component 360, communication interface 370 and/or the like) may provide, as output via the interface, a prediction, using the particular type of machine learning model, based on receiving the third data, as described above. In some implementations, the prediction is a text-completion prediction or an image recognition prediction.

Process 600 may include additional implementations, such as any single implementation or any combination of implementations described below and/or in connection with one or more other processes described elsewhere herein.

In a first implementation, process 600 may include automatically optimizing hyper parameters of the plurality of types of machine learning models to attempt to optimize the plurality of types of machine learning models.

In a second implementation, alone or in combination with the first implementation, process 600 may include providing, via a user interface, a visualization of model performance of the plurality of types of machine learning models at completing the natural language processing or image processing task; and receiving, via the user interface, a selection of the particular type of machine learning model based on providing the visualization of the model performance of the plurality of types of machine learning models.

In a third implementation, alone or in combination with one or more of the first and second implementations, process 600 may include optimizing hyper parameters of the particular type of machine learning model; and retraining the particular type of machine learning model based on optimizing the hyper parameters of the particular type of machine learning model.

In a fourth implementation, alone or in combination with one or more of the first through third implementations, process 600 may include deploying the particular type of machine learning model as a webservice for a plurality of client instances, and notifying a plurality of external applications based on deploying the particular type of machine learning model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, first data relating to a machine learning model;
   pre-processing, by the device, the first data to alter the first data to generate second data,
      wherein pre-processing the first data comprises:
         generating a clustering index value based on generating a set of clusters,
            wherein the clustering index value is associated with data purity and risk,
         identifying outlier data, of the first data, based on generating the clustering index value, and
         altering the first data to remove or alter the outlier data to generate the second data;
   processing, by the device, the second data to select a set of features from the second data;
   analyzing, by the device, the set of features to evaluate a plurality of types of machine learning models with respect to the set of features;
   selecting, by the device, a particular type of machine learning model, of the plurality of types of machine learning models, for the set of features based on analyzing the set of features to evaluate the plurality of types of machine learning models;
   tuning, by the device, a set of parameters of the particular type of machine learning model to train the machine learning model;
   providing, by the device, access to the particular type of machine learning model via an interface;
   receiving, by the device and as input via the interface, third data for prediction using the particular type of machine learning model; and
   providing, by the device and as output via the interface, a prediction using the particular type of machine learning model based on receiving the third data.

2. The method of claim 1, wherein processing the second data comprises:
   identifying a plurality of features of the second data; and
   performing a feature reduction procedure to identify the set of features from the plurality of features of the second data.

3. The method of claim 1, wherein analyzing the set of features to evaluate a plurality of types of machine learning models with respect to the set of features comprises:
   classifying the plurality of types of machine learning models based on a type of problem associated with the first data.

4. The method of claim 1, wherein analyzing the set of features to evaluate a plurality of types of machine learning models with respect to the set of features comprises:
   automatically optimizing hyper parameters of the plurality of types of machine learning models to attempt to optimize the plurality of types of machine learning models.

5. The method of claim 1, wherein analyzing the set of features to evaluate a plurality of types of machine learning models with respect to the set of features comprises:
   providing, via a user interface, a visualization of model performance of the plurality of types of machine learning models; and
   receiving, via the user interface, a selection of the particular type of machine learning model based on providing the visualization of the model performance of the plurality of types of machine learning models.

6. The method of claim 1, wherein tuning the set of parameters of the particular type of machine learning model comprises:
   optimizing hyper parameters of the particular type of machine learning model; and
   retraining the machine learning model based on optimizing the hyper parameters of the machine learning model.

7. The method of claim 1, wherein providing access to the particular type of machine learning model via the interface comprises:
   deploying the particular type of machine learning model as a webservice for a plurality of client instances; and
   notifying a plurality of external applications based on deploying the particular type of machine learning model.

8. A device, comprising:
   one or more memories; and
   one or more processors, communicatively coupled to the one or more memories, to:
      receive input data from a data source;
      pre-process and filter the input data to generate intermediate data based on receiving the input data,
         wherein the one or more processors, to pre-process the input data, are configured to:
            generate a clustering index value based on generating a set of clusters, wherein the clustering index value is associated with data purity and risk,
identify outlier data, of the input data, based on generating the clustering index value, and
alter the input data to remove or alter the outlier data to generate the intermediate data;
label one or more missing labels in the intermediate data to generate output data based on generating the intermediate data;
select, for the output data, a machine learning model, of a plurality of types of machine learning models, to apply to the output data;
tune a set of hyper-parameters for the machine learning model based on selecting the machine learning model;
establish a model pipeline for the machine learning model based on tuning the set of hyper-parameters;
receive prediction data based on establishing the model pipeline;
perform a prediction using the machine learning model and using the prediction data; and
provide the prediction for display via a user interface based on performing the prediction.

9. The device of claim 8, wherein the input data is associated with a plurality of languages; and
wherein the one or more processors are further to:
identify the plurality of languages; and
train, for the machine learning model, a plurality of sub-models for the plurality of languages.

10. The device of claim 8, wherein the machine learning model is a natural language processing model or a computer vision model.

11. The device of claim 8, wherein the prediction data is a first subset of a text entry and the prediction is a second subset of the text entry.

12. The device of claim 8, wherein the one or more processors are further to:
perform a cluster analysis on the input data,
wherein the cluster analysis is associated with a data purity or a data risk associated with the input data;
provide, via the user interface, a result of the cluster analysis; and
determine a modification to the input data based on providing the result of the cluster analysis via the user interface.

13. The device of claim 12, wherein the cluster analysis identifies a plurality of predicted sources of error in the input data.

14. The device of claim 8, wherein the one or more processors, when pre-processing and filtering the input data, are configured to perform at least one of:
a space-trimming procedure,
a case lowering procedure,
a stop words removal procedure,
a Boolean logic filtering procedure, or
a regular expression pattern matching procedure.

15. The device of claim 8, wherein the plurality of types of machine learning models includes at least one of:
a random forest classifier model,
a k-nearest neighbor model,
a decision tree model,
a multilayer perceptron model,
a stochastic gradient descent classifier model,
a logistic regression model,
a linear support vector classifier model,
a naïve Bayes model,
a ridge regression model,
a convolutional neural network model, or
an Inception v3 model.

16. A non-transitory computer-readable medium storing instructions, the instructions comprising:
one or more instructions that, when executed by one or more processors, cause the one or more processors to:
obtain first data relating to a natural language processing or image processing task;
pre-process and filter the first data to generate second data,
wherein the one or more instructions, that cause the one or more processors to pre-process the first data, cause the one or more processors to:
generate a clustering index value based on generating a set of clusters,
wherein the clustering index value is associated with data purity and risk,
identify outlier data, of the first data, based on generating the clustering index value, and
alter the first data to remove or alter the outlier data to generate the second data;
process the second data to select a set of features from a plurality of features of the second data;
apply the set of features to a plurality of types of machine learning models to evaluate the plurality of types of machine learning models with respect to completing the natural language processing or image processing task;
select a particular type of machine learning model, from the plurality of types of machine learning models, for the set of features based on applying the set of features to the plurality of types of machine learning models;
provide access to the particular type of machine learning model via an interface;
receive, as input via the interface, third data for prediction using the particular type of machine learning model; and
provide, as output via the interface, a prediction, using the particular type of machine learning model, based on receiving the third data,
wherein the prediction is a text-completion prediction or an image recognition prediction.

17. The non-transitory computer-readable medium of claim 16, wherein the one or more instructions, that cause the one or more processors to apply the set of features, cause the one or more processors to:
automatically optimize hyper parameters of the plurality of types of machine learning models to attempt to optimize the plurality of types of machine learning models.

18. The non-transitory computer-readable medium of claim 16, wherein the one or more instructions, that cause the one or more processors to apply the set of features, cause the one or more processors to:
provide, via a user interface, a visualization of model performance of the plurality of types of machine learning models at completing the natural language processing or image processing task; and
receive, via the user interface, a selection of the particular type of machine learning model based on providing the visualization of the model performance of the plurality of types of machine learning models.

19. The non-transitory computer-readable medium of claim 16, wherein the one or more instructions, when executed by the one or more processors, further cause the one or more processors to:

optimize hyper parameters of the particular type of machine learning model; and retrain the particular type of machine learning model based on optimizing the hyper parameters of the particular type of machine learning model.

20. The non-transitory computer-readable medium of claim 16, wherein the one or more instructions, that cause the one or more processors to provide access to the particular type of machine learning model via the interface, cause the one or more processors to:

deploy the particular type of machine learning model as a webservice for a plurality of client instances; and notify a plurality of external applications based on deploying the particular type of machine learning model.

* * * * *